US012083065B2

(12) United States Patent
Kim

(10) Patent No.: US 12,083,065 B2
(45) Date of Patent: Sep. 10, 2024

(54) SPINE-CORRECTING ORTHOPEDIC FOAM ROLLER FOR IMPROVING METABOLISM

(71) Applicant: MEDSAPIENS CO., LTD., Hanam-si (KR)

(72) Inventor: Hee Soo Kim, Hanam-si (KR)

(73) Assignee: MEDSAPIENS CO., LTD., Hanam-si (KR)

( * ) Notice: Subject to any disclaimer, the term of this patent is extended or adjusted under 35 U.S.C. 154(b) by 852 days.

(21) Appl. No.: 16/975,139

(22) PCT Filed: Jun. 17, 2019

(86) PCT No.: PCT/KR2019/007254
§ 371 (c)(1),
(2) Date: Aug. 24, 2020

(87) PCT Pub. No.: WO2020/004846
PCT Pub. Date: Jan. 2, 2020

(65) Prior Publication Data

US 2021/0113423 A1 Apr. 22, 2021

(30) Foreign Application Priority Data

Jun. 28, 2018 (KR) ........................ 10-2018-0074642

(51) Int. Cl.
*A61H 15/00* (2006.01)
*A61H 39/04* (2006.01)

(52) U.S. Cl.
CPC ..... *A61H 15/00* (2013.01); *A61H 2015/0014* (2013.01); *A61H 39/04* (2013.01);
(Continued)

(58) Field of Classification Search
CPC ................ A61H 15/00; A61H 15/0085; A61H 15/0092; A61H 39/00; A61H 39/02;
(Continued)

(56) References Cited

U.S. PATENT DOCUMENTS

D248,493 S * 7/1978 Moncrief ...................... 601/120
4,712,539 A * 12/1987 Kim .................. A61H 15/0092 601/120
(Continued)

FOREIGN PATENT DOCUMENTS

JP 2000-116817 A 4/2000
KR 200325405 Y1 * 9/2003
(Continued)

OTHER PUBLICATIONS

Translation of KR-200325405-Y1. (Year: 2003).*
International Search Report for PCT/KR2019/007254 mailed Sep. 23, 2019 from Korean Intellectual Property Office.

*Primary Examiner* — Valerie L Woodward
*Assistant Examiner* — Paige Kathleen Bugg
(74) *Attorney, Agent, or Firm* — Revolution IP, PLLC

(57) ABSTRACT

A spine-correcting orthopedic foam roller for improving metabolism, includes: a spinous process accommodation groove for accommodating spinous processes of the spine; a transversus process stimulating part extending from the spinous process accommodation groove and protruding from a portion thereof corresponding to transversus processes of the spine; and a junctional process accommodation groove extending from the transversus process stimulating part in an axial direction and accommodating junctional processes, which are the ends of the transversus processes at which transverse costal facets are formed.

3 Claims, 9 Drawing Sheets

(52) U.S. Cl.
CPC ................ *A61H 2201/1253* (2013.01); *A61H 2201/1645* (2013.01); *A61H 2205/081* (2013.01)

(58) Field of Classification Search
CPC ............ A61H 39/04; A61H 2201/1645; A62H 2015/0014; A62H 2015/0042; A62H 2205/081; A63B 23/006; A63B 23/02; A63B 23/0233; A63B 23/0238; A63B 23/025
USPC .......................................................... 601/121
See application file for complete search history.

(56) References Cited

U.S. PATENT DOCUMENTS

| | | | | |
|---|---|---|---|---|
| 4,945,900 | A * | 8/1990 | Masuda | A61H 15/0092 601/120 |
| 6,974,427 | B1 * | 12/2005 | Lapham | A61H 15/00 601/135 |
| D700,709 | S * | 3/2014 | Khodabakhshian | D24/211 |
| D734,480 | S * | 7/2015 | Jones | D24/211 |
| 9,463,133 | B2 * | 10/2016 | Rodgers | A61H 7/005 |
| D829,920 | S * | 10/2018 | Carpinelli | D24/211 |
| D833,026 | S * | 11/2018 | Khodabakhshian | D24/211 |
| 10,561,923 | B1 * | 2/2020 | Harvey | A63B 71/0036 |
| 10,813,828 | B1 * | 10/2020 | Cohen | A61H 1/00 |
| 10,864,135 | B2 * | 12/2020 | Carlson | A61H 15/0092 |
| 2015/0133835 | A1 * | 5/2015 | Fadil | A61H 7/001 601/118 |
| 2018/0326254 | A1 * | 11/2018 | Earls | A63B 26/003 |
| 2019/0274864 | A1 * | 9/2019 | Shin | A61H 1/008 |
| 2021/0275854 | A1 * | 9/2021 | Jones | A63B 23/00 |

FOREIGN PATENT DOCUMENTS

| | | | |
|---|---|---|---|
| KR | 10-2011-0106512 | A | 9/2011 |
| KR | 10-1430899 | B1 | 8/2014 |
| KR | 20-2015-0004319 | U | 12/2015 |

* cited by examiner

SPINE-CORRECTING ORTHOPEDIC FOAM ROLLER FOR IMPROVING METABOLISM

TECHNICAL FIELD

The present invention relates to a spine-correcting orthopedic foam roller for improving metabolism, and more particularly, to a spine-correcting orthopedic foam roller for improving metabolism, which allows a user to move vertebrae, ribs, and a pelvis of his/her body by using his/her weight, like receiving a treatment from a manual therapist, so as to promote a self-correcting ability of the body to balance the body, and assists the user in correcting his/her spine at home alone.

BACKGROUND ART

In general, a foam roller refers to a cylindrical object that a user may use to take exercise with the foam roller pressed against his/her back, and the foam roller assists the user in relaxing his/her muscles and muscle fasciae. Because modern people spend not less than 8 hours a day while sifting on the chairs, great stress is applied to the spine. In addition, various types of musculoskeletal pain diseases or nervous diseases are often caused by abnormality of the spine. Therefore, the spinal core exercise is required for spinal care, and the foam rollers are widely used for the spinal core exercise.

However, the foam roller in the related art is only focused on relaxing the muscles and the muscle fasciae, and there is no product applied with the principle of correction exercise that restores the vertebrae to the normal positions by biomechanically pressing the vertebrae.

In addition, because the human body sensitively responds to pressure and motion from the head to the coccyx, the spine is twisted when abnormal pressure is applied to the spine. In this case, the spinal nerves positioned at both sides of the vertebrae are compressed, which causes a deterioration in neurotransmission and unbalance of the muscles.

In addition, the twisted spin affects the spinal cord passing through the spinal canal, the arachnoid containing the cerebrospinal fluid, and the dura mater surrounding the nerves, which damages the central nerve system and degrades the circulation of the cerebrospinal fluid.

As a result, the metabolism of the human body decreases, the circulation of the bodily fluid is degraded, and the swelling of the body is often caused because waste matters cannot be discharged to the outside of the body. For this reason, the body fat is accumulated in the human body, which causes obesity.

In the related art, in order to improve the metabolism and correct the spine, a manual therapist, a physiotherapist, or a chiropractor manually correct the spine. Examples of surgical techniques include osteopathic medicine, chiropractic, and manual therapy such as manual therapy for spinal joints.

However, because such a treatment method requires a practitioner to directly diagnose and treat the patient's spinal condition, there is a limitation in that a large amount of time, efforts, and costs and a large space are required for the manual therapy.

Accordingly, there is a need for development of a foam roller that assists in improving metabolism while correcting the vertebrae, the ribs, the pelvis, and the like.

DISCLOSURE

Technical Problem

Objects to be achieved by the present invention are as follows.

First, an object of the present invention is to provide a foam roller that assists in treating spinal segment subluxation while relaxing local muscles and muscle fasciae with deep stimulation.

Second, another object of the present invention is to provide a foam roller capable of achieving, from self-therapy, a treatment effect that may be received from a manual therapist.

Third, still another object of the present invention is to provide a foam roller capable of correcting entire postures of the ribs, the vertebrae, and the sacrum through the exercise for each part.

Technical problems of the present invention are not limited to the aforementioned technical problems, and other technical problems, which are not mentioned above, may be clearly understood by those skilled in the art from the following descriptions.

Technical Solution

In order to achieve the above-mentioned objects, a spine-correcting orthopedic foam roller for improving metabolism according to an exemplary embodiment of the present invention includes: a spinous process accommodation groove configured to accommodate a spinous process of a vertebra; transverse process stimulating parts extending from the spinous process accommodation groove and protruding from portions of the spine-correcting orthopedic foam roller corresponding to transverse processes of the vertebra; and junctional process accommodation grooves extending in an axial direction from the transverse process stimulating parts and configured to accommodate junctional processes which are ends of the transverse processes at which transverse costal facets are formed.

In addition, a spine-correcting orthopedic foam roller for improving metabolism according to another exemplary embodiment of the present invention includes: a spinous process accommodation groove configured to accommodate a spinous process of a vertebra; costal tubercle stimulating protrusions protruding from portions of the spine-correcting orthopedic foam roller corresponding to costal tubercles; and transverse process stimulating parts formed between the spinous process accommodation grooves and the costal tubercle stimulating protrusions and protruding from portions of the spine-correcting orthopedic foam roller corresponding to transverse processes of the vertebra.

In addition, a spine-correcting orthopedic foam roller for improving metabolism according to still another exemplary embodiment of the present invention includes: costal shaft accommodation grooves recessed in portions of the spine-correcting orthopedic foam roller corresponding to costal shafts so as to accommodate scapulae or ribs; junctional process accommodation grooves configured to accommodate junctional processes which are ends of transverse processes at which transverse costal facets are formed; and costal tubercle stimulating protrusions formed between the costal shaft accommodation grooves and the junctional process accommodation grooves, protruding from portions of the spine-correcting orthopedic foam roller corresponding to costal tubercles, and having a shape that decreases in height toward the costal shaft accommodation groove.

Other detailed matters of the exemplary embodiment are included in the detailed description and the drawings.

Advantageous Effects

According to the present invention, the following effects are achieved.

First, the present invention provides the foam roller that assists in treating spinal segment subluxation while relaxing local muscles and muscle fasciae with deep stimulation.

Second, the present invention provides the foam roller capable of achieving, from self-therapy, a treatment effect that may be received from a manual therapist.

Third, the present invention provides the foam roller capable of correcting entire postures of ribs, vertebrae, and a sacrum through the exercise for each part.

The effects of the present invention are not limited to the aforementioned effects, and other effects, which are not mentioned above, will be clearly understood by those skilled in the art from the claims.

BEST MODE

Figure 1:
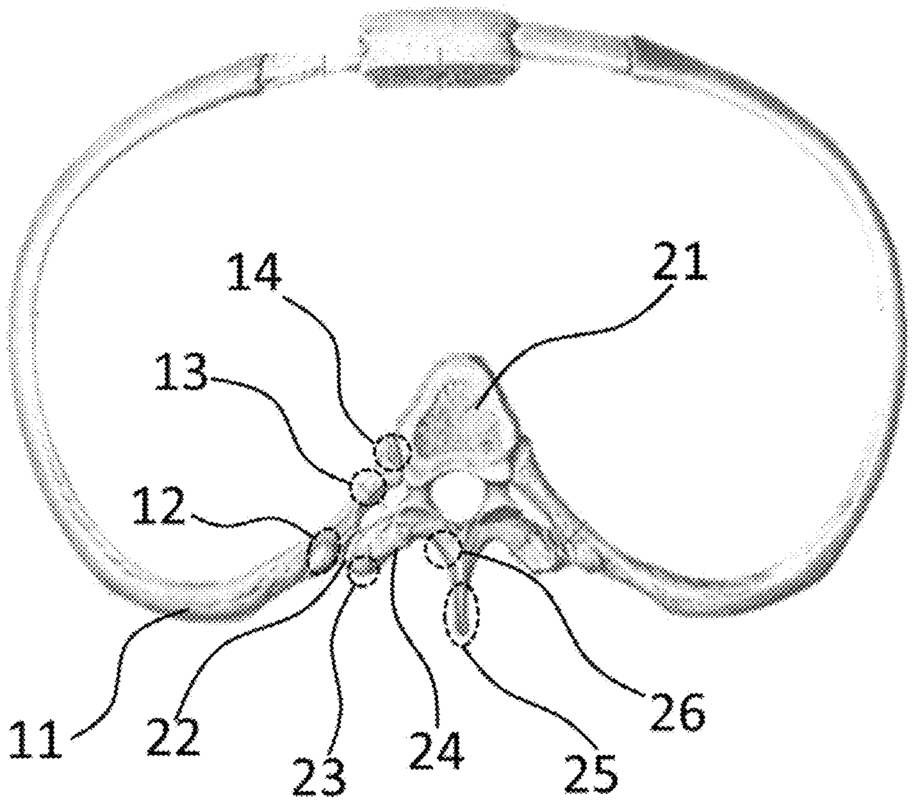
FIG. 1 is a view illustrating a relationship between a vertebra and ribs.

Advantages and features of the present invention and methods of achieving the advantages and features will be clear with reference to exemplary embodiments described in detail below together with the accompanying drawings.

However, the present invention is not limited to the exemplary embodiments disclosed herein but will be implemented in various forms. The exemplary embodiments of the present invention are provided so that the present invention is completely disclosed, and a person with ordinary skill in the art can fully understand the scope of the present invention. The present invention will be defined only by the scope of the appended claims. Throughout the specification, the same reference numerals denote the same constituent elements.

Hereinafter, the present invention will be described with reference to the drawings.

FIG. 1 is a view illustrating a relationship between a vertebra and ribs.

Referring to FIG. 1, a costal shaft 11 refers to a main body of a rib that occupies most curved portions of the rib. The costal head 14 refers to a head portion of the rib. A joint of the costal head 14 exists at an end of the costal head 14. The joint of the costal head 14 connects the rib and the thoracic vertebra. A costal neck 13 connects the costal head 14 and the costal shaft 11. A costal tubercle 12 exists between the costal neck 13 and the costal shaft 11. The costal tubercle 12 is raised bluntly.

The vertebra includes a spinous process 25, transverse processes 24, and laminae 26 about a vertebral body 21. The lamina 26 connects the spinous process 25 and the transverse process 24. The lamina 26 connects the spinous process 25 and the transverse process 24. A transverse costal facet 22 is an end of the transverse process 24 of the vertebra and serves as a connection point between the rib and the transverse process 24. A joint of the transverse costal facet 22 exists at an end of the transverse costal facet 22. The rib and the vertebra are connected to each other through the transverse costal facet 22 and the costal head 14. The rib and the vertebra are connected to each other through two joints.

The terms 'stimulation', 'stimulation force', 'restoring force', and the like used to describe the present invention mean reactions to a weight generated by a user lying on the foam roller 100.

Figure 2:
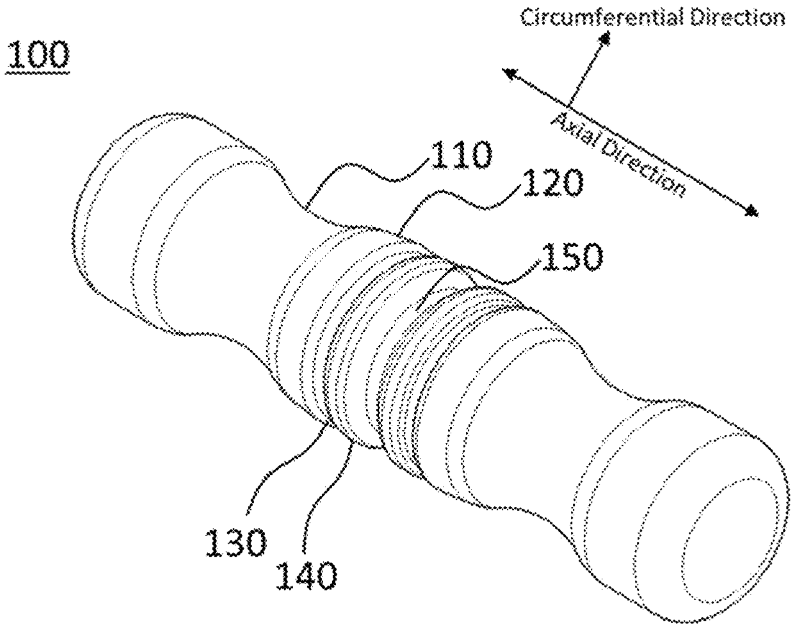
FIG. 2 is a perspective view of a spine-correcting orthopedic foam roller for improving metabolism according to an exemplary embodiment of the present invention.
Figure 3:
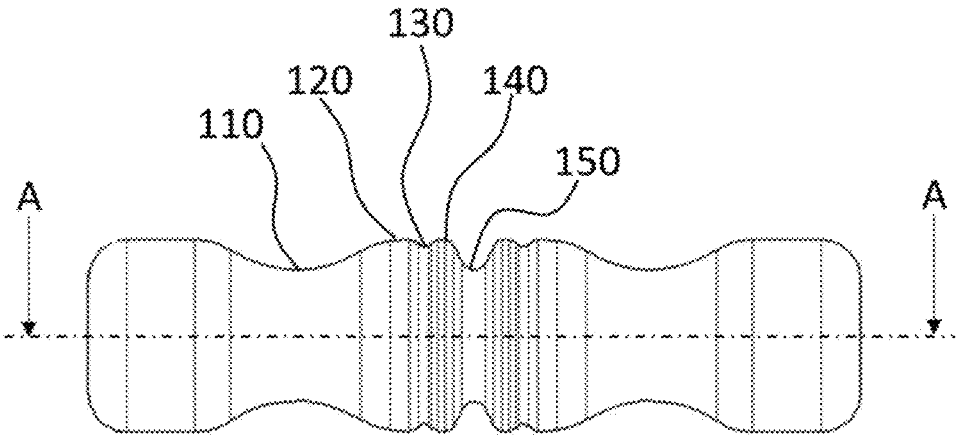
FIG. 3 is a front view of the spine-correcting orthopedic foam roller for improving metabolism according to the exemplary embodiment of the present invention.
Figure 4:
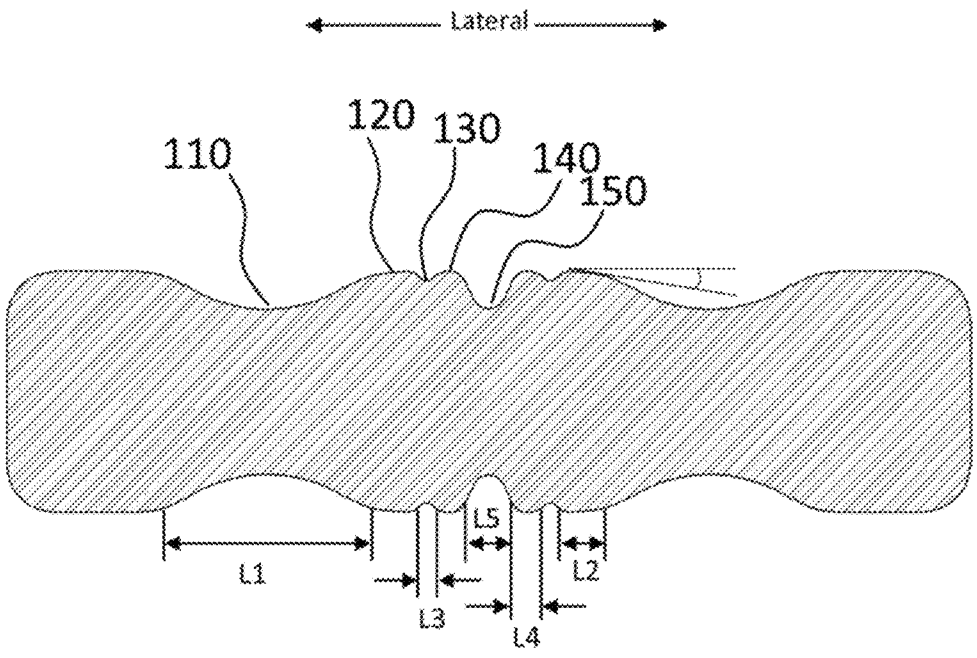
FIG. 4 is a cross-sectional view taken along line A-A in FIG. 2.
Figure 5:
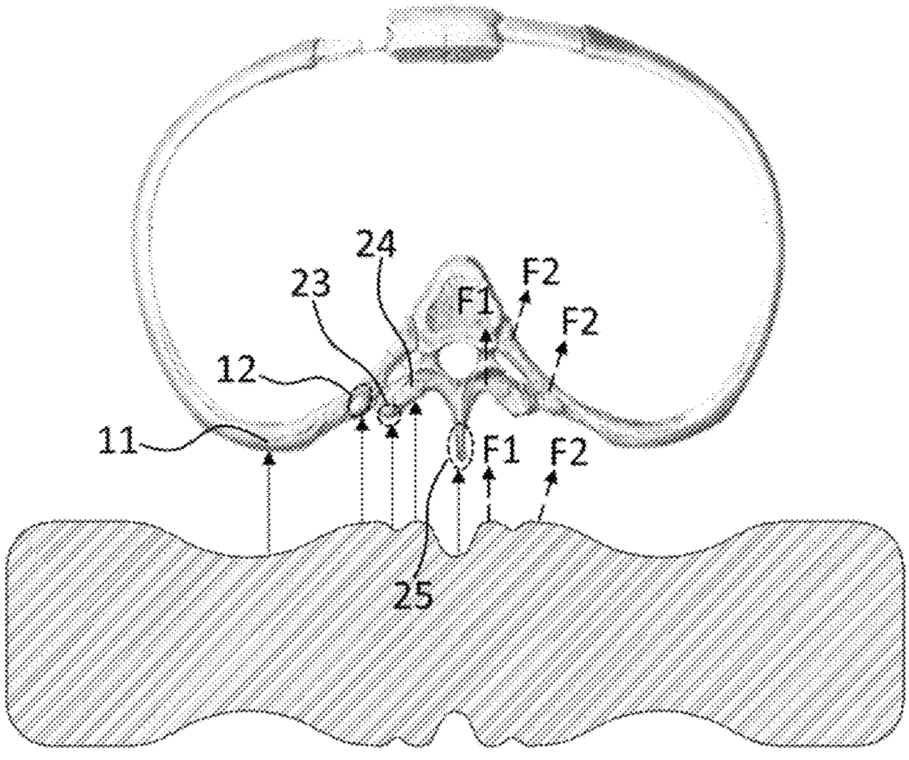
FIG. 5 is a view illustrating stimulation points of the spine-correcting orthopedic foam roller for improving metabolism according to the exemplary embodiment of the present invention.
Figure 6:
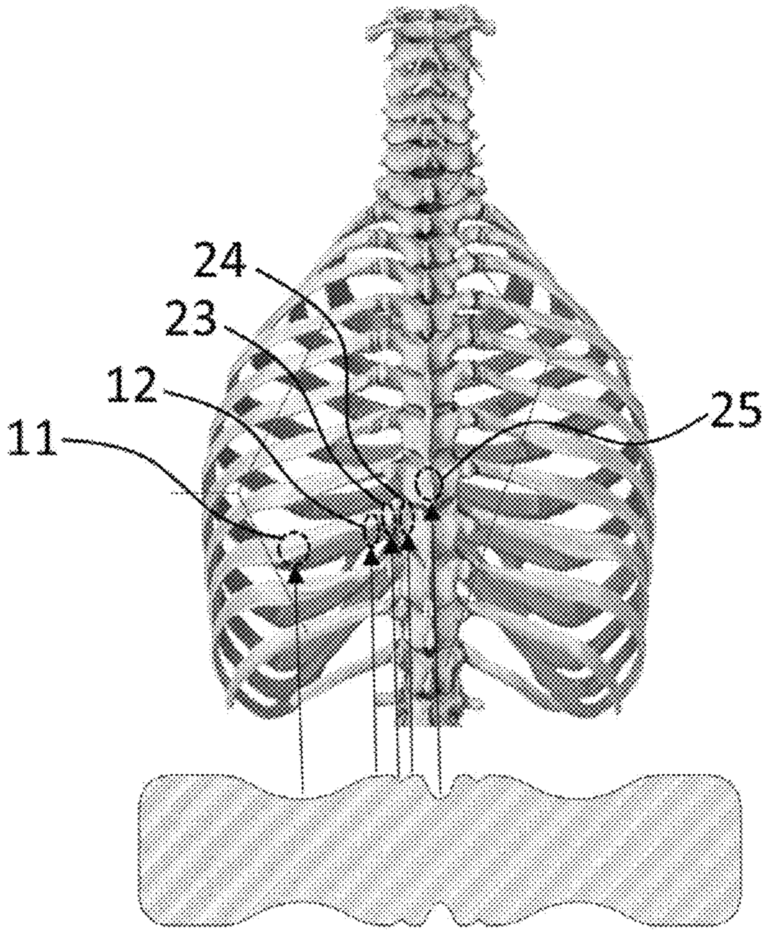
FIG. 6 is a view illustrating the stimulation points in FIG. 5 in more detail.

FIG. 2 is a perspective view of a spine-correcting orthopedic foam roller 100 for improving metabolism according to an exemplary embodiment of the present invention. FIG. 3 is a front view of the spine-correcting orthopedic foam roller 100 for improving metabolism according to the exemplary embodiment of the present invention. FIG. 4 is a cross-sectional view taken along line A-A in FIG. 2. FIG. 5 is a view illustrating stimulation points of the spine-correcting orthopedic foam roller 100 for improving metabolism according to the exemplary embodiment of the present invention. FIG. 6 is a view illustrating the stimulation points in FIG. 5 in more detail.

Referring to FIGS. 2 to 6, the spine-correcting orthopedic foam roller 100 for improving metabolism according to the exemplary embodiment of the present invention has a rod shape and includes a spinous process accommodation groove 150 configured to accommodate the spinous process 25 of the vertebra; transverse process stimulating parts 140 extending from the spinous process accommodation groove 150 and protruding from portions of the spine-correcting orthopedic foam roller 100 corresponding to the transverse processes 24 of the vertebra; and junctional process accommodation grooves 130 configured to accommodate junctional processes 23 which are ends of the transverse processes 24 at which the transverse costal facets 22 are formed.

The foam roller 100 may have a rod shape having protrusions and grooves formed on an outer circumferential surface thereof. However, the rod shape is not limited only to a completely cylindrical shape, a cross section of the foam roller 100 may have a fan shape. The exemplary embodiments, which may be modified, will be described below.

The spinous process accommodation groove 150 is a groove formed in a ring shape at a center of the foam roller

100. The spinous process accommodation groove 150 reduces unnecessary stimulation to the protruding spinous process 25 of the vertebra. The spinous process accommodation groove 150 corrects the arrangement of the spinous processes 25 to the normal condition.

The transverse process stimulating parts 140 extend from the spinous process accommodation groove 150. The transverse process stimulating parts 140 stimulate the transverse processes 24 to correct the spine, which is bent in a front-rear direction of the human body, to the normal condition.

The transverse costal facets 22 are the points formed at the ends of the transverse processes 24 and connected to the costal shafts 11. The junctional process 23 refers to a bluntly protruding portion of the transverse costal facet 22. The junctional process 23 protrudes rearward, that is, toward the back of the human body. The junctional process accommodation groove 130 is recessed so as to prevent unnecessary stimulation from being applied to the junctional process 23. The junctional process accommodation groove 130 guides and positions the junctional process 23 in the junctional process accommodation groove 130 which is the correct position.

The spine-correcting orthopedic foam roller 100 for improving metabolism according to the present invention positions the spinous process 25 in the spinous process accommodation groove 150 and positions the junctional processes 23 in the junctional process accommodation grooves 130. Therefore, the foam roller 100 allows the twisted spine to be stretched to the normal state.

The spine-correcting orthopedic foam roller 100 for improving metabolism according to the exemplary embodiment of the present invention includes costal shaft accommodation grooves 110 extending from the junctional process accommodation grooves 130 and recessed in portions of the spine-correcting orthopedic foam roller 100 corresponding to the costal shafts 11 so as to accommodate the ribs.

The costal shaft 11 has a shape curved rearward toward the back of the human body. The costal shaft accommodation groove 110 has a curved shape in order to accommodate the curved costal shaft 11.

The spine-correcting orthopedic foam roller 100 for improving metabolism according to the present invention positions the spinous process 25 in the spinous process accommodation groove 150, positions the junctional processes 23 in the junctional process accommodation grooves 130, and positions the costal shafts 11 in the costal shaft accommodation grooves 110.

The costal shaft accommodation groove 110 fixes the costal shaft 11 to the normal position. The spinous process accommodation groove 150 fixes the spinous process 25 to the normal position. The junctional process accommodation groove 130 fixes the junctional process 23 to the normal position.

The spine-correcting orthopedic foam roller 100 for improving metabolism according to the exemplary embodiment of the present invention includes costal tubercle stimulating protrusions 120 formed between the costal shaft accommodation grooves 110 and the junctional process accommodation grooves 130 and protruding from portions of the spine-correcting orthopedic foam roller 100 corresponding to costal tubercles 12.

The costal tubercle stimulating protrusion 120 stimulates the costal tubercle 12. The costal tubercle 12 is a portion protruding rearward, that is, toward the back of the human body.

The costal tubercle stimulating protrusion 120 applies a pressure to the costal tubercle 12 to restore the costal shaft 11 to the normal position. The pressure applied to the costal tubercle 12 simultaneously stimulates the joint of the costal head 14 and the joint of the transverse costal facet 22.

The costal tubercle stimulating protrusion 120 extends in the axial direction from the junctional process accommodation groove 130 and protrudes from the portions of the spine-correcting orthopedic foam roller 100 corresponding to the costal tubercle. The junctional process accommodation groove 130 receives the junctional process 23, such that the costal tubercle stimulating protrusion 120 pushes the costal tubercle 12 with stronger force. If there is no junctional process accommodation groove 130, the costal tubercle 12 and the costal tubercle stimulating protrusion 120 may be spaced apart from each other by the protruding junctional process 23, which decreases stimulation force. The strong acupressure effect restores the twisted ribs to the normal positions.

The spinous process accommodation groove 150, the transverse process stimulating parts 140, the junctional process accommodation grooves 130, the costal shaft accommodation grooves 110, and the costal tubercle stimulating protrusions 120 are formed on the outer circumferential surface in a circumferential direction.

The user uses the foam roller 100 by rolling the foam roller 100 on his/her back. The spinous process accommodation groove 150, the transverse process stimulating parts 140, the junctional process accommodation grooves 130, the costal shaft accommodation grooves 110, and the costal tubercle stimulating protrusions 120 are formed as ring-shaped grooves in the outer circumferential surface.

An axial length L1 of the costal shaft accommodation groove 110 is 100 to 140 mm, and an axial length L2 of the costal tubercle stimulating protrusion 120 is 20 to 30 mm. An axial length L3 of the junctional process accommodation groove 130 is 10 to 30 mm, an axial length L4 of the transverse process stimulating part 140 is 10 to 30 mm, and an axial length L5 of the spinous process accommodation groove 150 is 30 to 40 mm.

The above-mentioned numerical values are derived from the sizes of the spine of the human body and various exemplary embodiments implemented to obtain the effect of correcting the spine.

Figure 7:
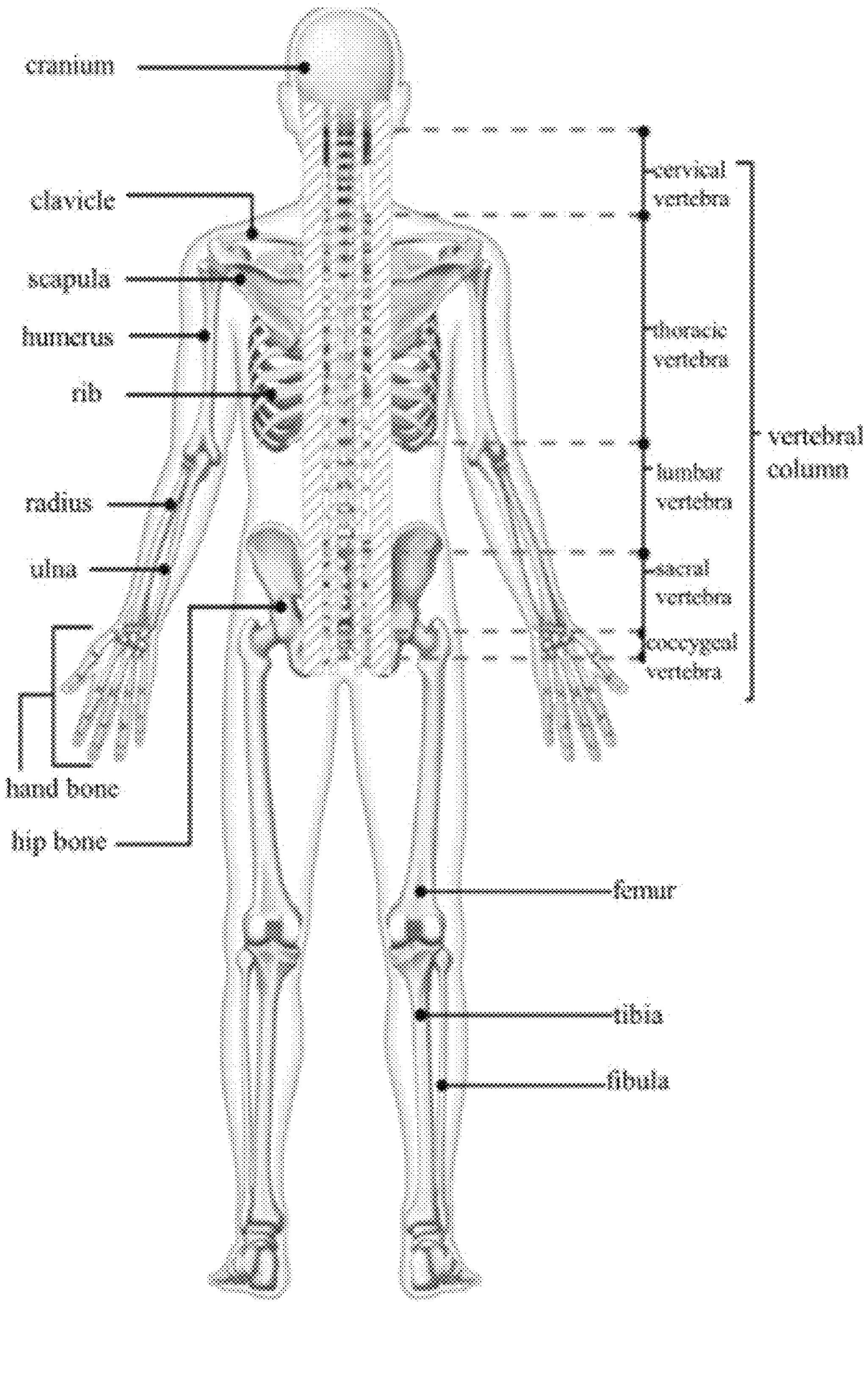
FIG. 7 is a view illustrating points that may be stimulated by the spine-correcting orthopedic foam roller for improving metabolism according to the exemplary embodiment of the present invention with reference to bones of a human body.

FIG. 7 is a view illustrating points that may be stimulated by the spine-correcting orthopedic foam roller 100 for improving metabolism according to the exemplary embodiment of the present invention with reference to bones of a human body.

Referring to FIGS. 4 to 7, the foam roller 100 having a rod shape includes the spinous process accommodation groove 150 configured to accommodate the spinous process 25 of the vertebra; the costal shaft accommodation grooves 110 recessed in the portions of the foam roller 100 corresponding to the costal shafts 11 so as to accommodate the scapulae or ribs; and the costal tubercle stimulating protrusions 120 formed between the costal shaft accommodation grooves 110 and the spinous process accommodation groove 150 and protruding from the portions of the foam roller 100 corresponding to the costal tubercles 12.

The scapulae refer to bones each having an inverted triangular shape and connecting the two arms and the torso. The scapula forms the shoulder joint and exists above the rib. When the foam roller 100 moves along the spine which is the center of the human body, the costal shaft accommodation groove 110 corresponds to the scapula. The costal tubercle stimulating protrusions 120 formed at the periphery of the costal shaft accommodation grooves 110 stimulate the scapulae and the muscles around the scapulae.

The spine-correcting orthopedic foam roller 100 for improving metabolism according to the exemplary embodiment of the present invention includes the transverse process stimulating parts 140 formed between the spinous process accommodation groove 150 and the costal tubercle stimulating protrusions 120 and protruding from the portions of the spine-correcting orthopedic foam roller 100 corresponding to the transverse processes 24 of the vertebra.

The spine-correcting orthopedic foam roller 100 for improving metabolism according to the exemplary embodiment of the present invention includes the junctional process accommodation grooves 130 formed between the transverse process stimulating parts 140 and the costal tubercle stimulating protrusions 120 and configured to accommodate the junctional processes 23 which are the ends of the transverse processes 24 at which the transverse costal facets 22 are formed.

The spinous process accommodation groove 150 is formed at the axial center of the foam roller 100, and the transverse process stimulating parts 140 are formed at left and right sides outside the spinous process accommodation groove 150. The junctional process accommodation grooves 130 are formed outside the transverse process stimulating parts 140. The costal tubercle stimulating protrusions 120 are formed outside the junctional process accommodation grooves 130. The costal shaft accommodation grooves 110 are formed outside the costal tubercle stimulating protrusions 120.

The spine-correcting orthopedic foam roller for improving metabolism according to the exemplary embodiment of the present invention includes the costal shaft accommodation grooves 110 recessed in the portions of the spine-correcting orthopedic foam roller corresponding to the costal shafts so as to accommodate the scapulae or ribs; the junctional process accommodation grooves 130 configured to accommodate the junctional processes 23 which are the ends of the transverse processes 24 at which the transverse costal facets are formed; and the costal tubercle stimulating protrusions 120 formed between the costal shaft accommodation grooves 110 and the junctional process accommodation grooves 130, protruding from the portions of the spine-correcting orthopedic foam roller corresponding to the costal tubercles, and having a shape that decreases in height toward the costal shaft accommodation groove 110.

The transverse process stimulating part 140 applies force in a direction F1. The costal tubercle stimulating protrusion 120 applies force in a direction F2. The costal tubercle stimulating protrusion 120 applies force to the costal tubercle 12 in the direction F2 and also applies force, in the same direction, to the costal head 14 connected to costal tubercle 12.

An inclined shape of the costal tubercle stimulating protrusion 120 applies force in a direction horizontal to the direction F2. Therefore, the positions of the twisted costal heads 14 and the twisted costal tubercles 12 are corrected.

The costal shaft accommodation grooves 110, the junctional process accommodation grooves 130, and the spinous process accommodation grooves 150 accommodate the protruding portions, thereby increasing the magnitude of the force in the directions F1 and F2.

The axial length L1 of the costal shaft accommodation groove 110 is 100 to 140 mm, the axial length L2 of the costal tubercle stimulating protrusion 120 is 20 to 30 mm, the axial length L3 of the junctional process accommodation groove 130 is 10 to 30 mm, the axial length L4 of the transverse process stimulating part 140 is 10 to 30 mm, and the axial length L5 of the spinous process accommodation groove 150 is 30 to 40 mm.

Figure 8:
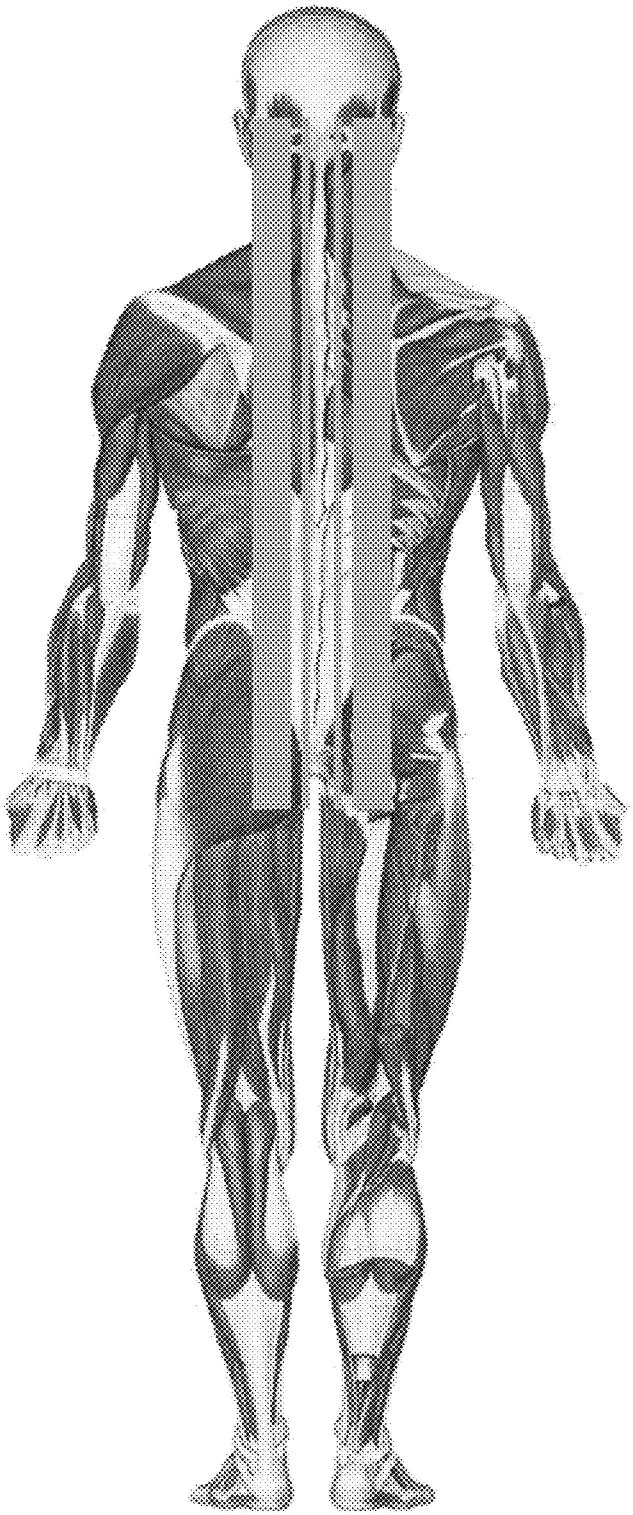
FIG. 8 is a view illustrating muscle parts to be stimulated by the spine-correcting orthopedic foam roller for improving metabolism according to the exemplary embodiment of the present invention.
Figure 9:
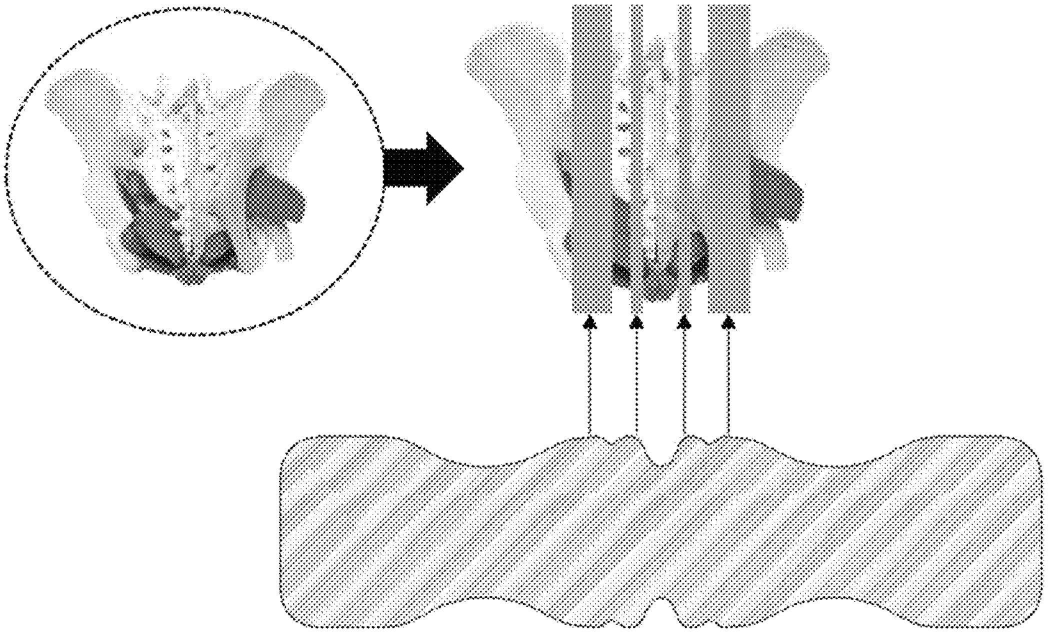
FIG. 9 is a view illustrating stimulation points on a pelvis to be stimulated by the spine-correcting orthopedic foam roller for improving metabolism according to the exemplary embodiment of the present invention.

FIG. 8 is a view illustrating muscle parts to be stimulated by the spine-correcting orthopedic foam roller 100 for improving metabolism according to the exemplary embodiment of the present invention. FIG. 9 is a view illustrating stimulation points on a pelvis to be stimulated by the spine-correcting orthopedic foam roller 100 for improving metabolism according to the exemplary embodiment of the present invention.

Referring to FIGS. 8 to 9, the spine-correcting orthopedic foam roller 100 for improving metabolism according to the exemplary embodiment of the present invention has a rod shape and includes the spinous process accommodation groove 150 recessed in the portion of the spine-correcting orthopedic foam roller 100 corresponding to an extension line of the spinous processes 25 and the sacral apex of the sacrum of the spine; the costal shaft accommodation grooves 110 recessed in the portions of the spine-correcting orthopedic foam roller 100 corresponding to extension lines of the scapulae, the costal shafts 11, and the hamstring muscles of the femora below the pelvis; and the costal tubercle stimulating protrusions 120 formed between the rib accommodation grooves and the spinous process accommodation groove 150 and protruding from the portions of the spine-correcting orthopedic foam roller 100 corresponding to the costal tubercles 12 and extension lines of the posterior superior iliac spines (PSISs), which are positioned above the pelvis, and the ischial tuberosities positioned below the pelvis.

When the foam roller 100 moves along the spine which is the center of the human body, the spinous process accommodation groove 150 is positioned to accommodate the sacral apex of the sacrum. When the spinous process accommodation groove 150 accommodates the sacral apex, the costal shaft accommodation grooves 110 stimulate the lower portion of the pelvis, and specifically, stimulate the hamstrings positioned behind the femora.

The costal tubercle stimulating protrusions 120 stimulate the posterior superior iliac spines which are protrusions positioned on the rear surface of the pelvis. In addition, the costal tubercle stimulating protrusions 120 stimulate the ischial tuberosities that constitute the two lower portions of the pelvis.

Figure 10:
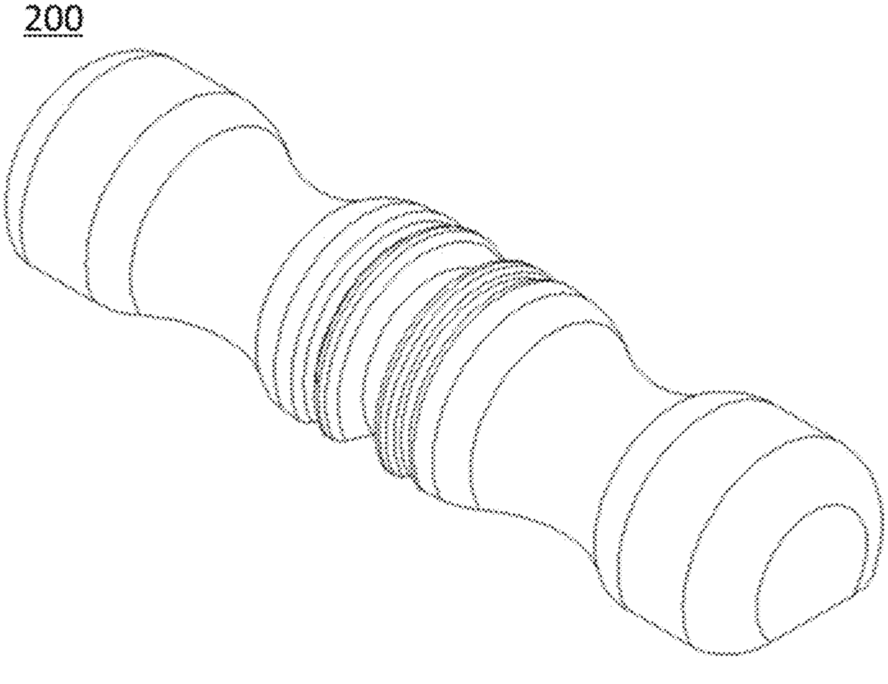
FIG. 10 is a perspective view of a spine-correcting orthopedic foam roller for improving metabolism according to another exemplary embodiment of the present invention.
Figure 11:
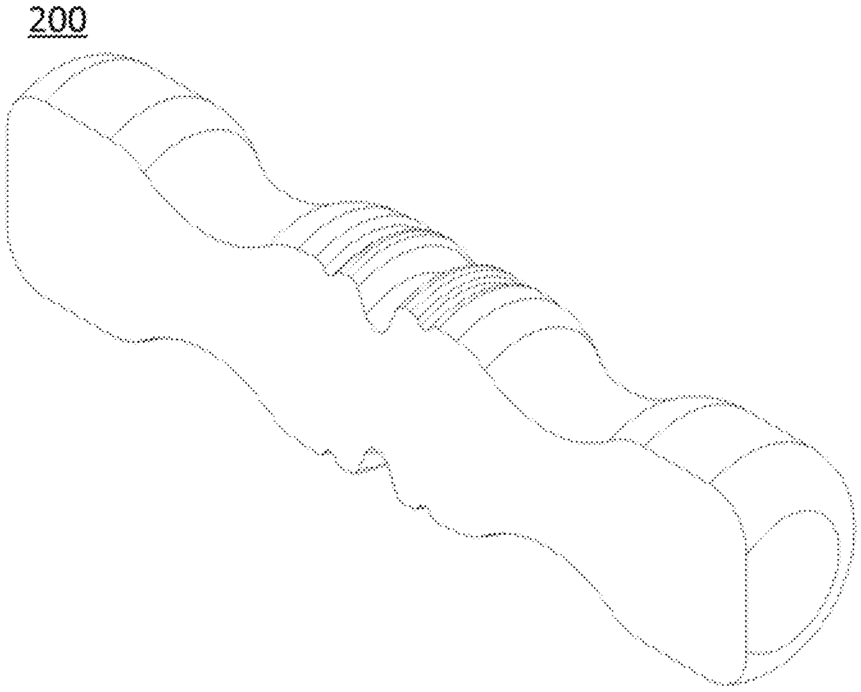
FIG. 11 is a perspective view of the exemplary embodiment in FIG. 10 when viewed from below.

FIG. 10 is a perspective view of a spine-correcting orthopedic foam roller for improving metabolism according to another exemplary embodiment of the present invention. FIG. 11 is a perspective view of the exemplary embodiment in FIG. 10 when viewed from below.

Referring to FIGS. 10 and 11, a spine-correcting orthopedic foam roller 200 for improving metabolism according to another exemplary embodiment of the present invention may have an approximately semicylindrical shape having a flat bottom surface. The flat bottom surface serves to fix the foam roller 300 on the ground surface.

Figure 12:
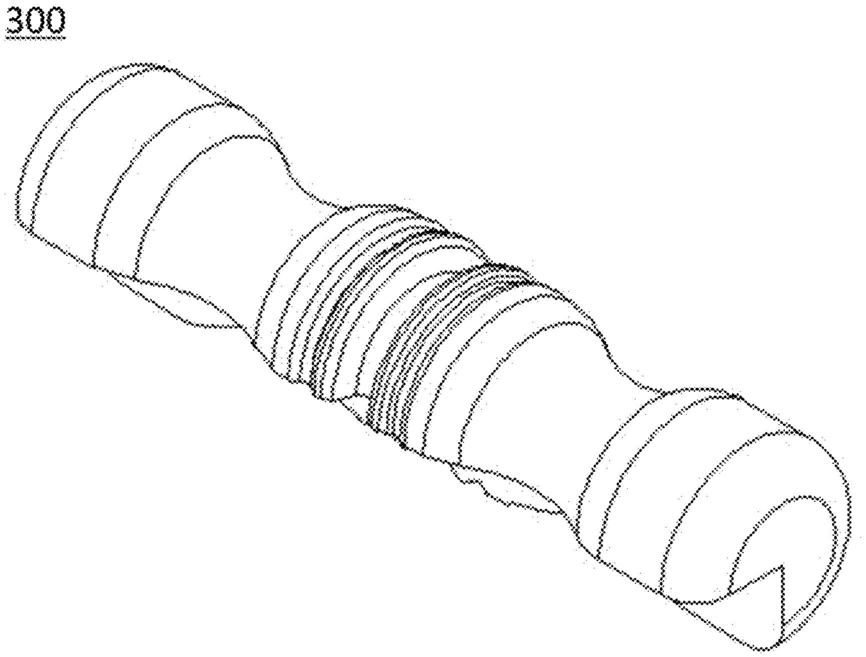
FIG. 12 is a perspective view of a spine-correcting orthopedic foam roller for improving metabolism according to still another exemplary embodiment of the present invention.
Figure 13:
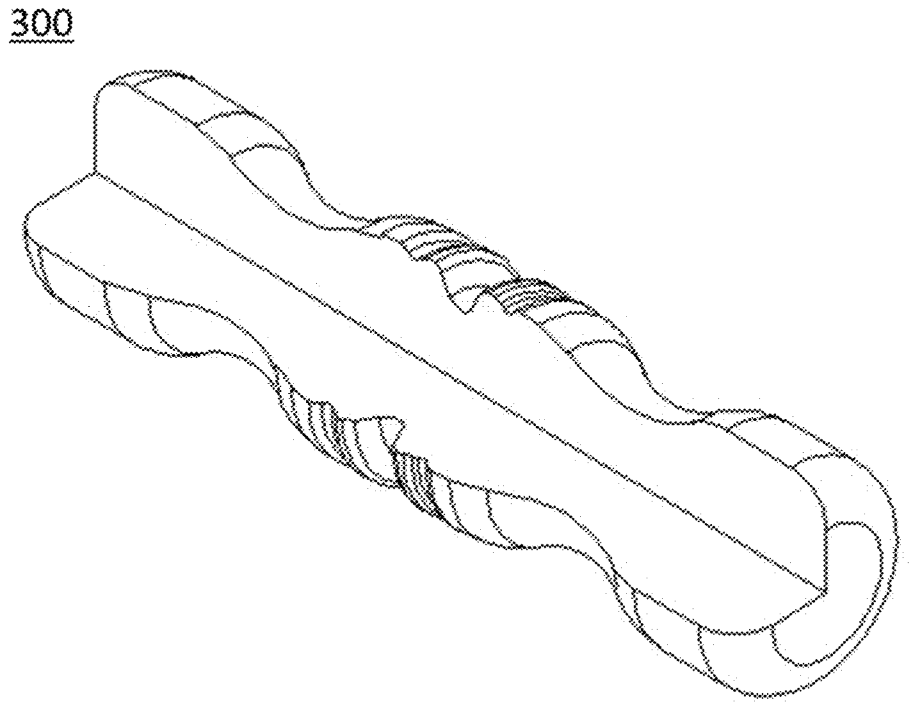
FIG. 13 is a perspective view of the exemplary embodiment in FIG. 12 when viewed from below.

FIG. 12 is a perspective view of a spine-correcting orthopedic foam roller for improving metabolism according to still another exemplary embodiment of the present invention. FIG. 13 is a perspective view of the exemplary embodiment in FIG. 12 when viewed from below.

Referring to FIGS. 12 and 13, a spine-correcting orthopedic foam roller 300 for improving metabolism according to still another exemplary embodiment of the present invention may have a rod shape having a cross section having a fan shape. The cut surface serves to fix the foam roller 300 on the ground surface.

The spine-correcting orthopedic foam roller 100 for improving metabolism according to the exemplary embodiment of the present invention may be used as follows.

First, the foam roller 100 may be used to correct the spine. The user puts the foam roller 100 on the back and moves his/her upper body so that the center of the foam roller 100 is placed on the spinous processes 25 on the spine. The foam roller 100 is centered by the spinous process accommodation groove 150 and moved upward or downward along the human body. The spinous process accommodation groove 150 and the transverse process stimulating parts 140 guide the twisted spine to the normal position. The junctional process accommodation grooves 130 accommodate the protruding junctional processes 23. Therefore, the transverse processes 24 are in closer contact with the transverse process stimulating parts 140, and the costal tubercle stimulating protrusions 120 are also in closer contact with the costal tubercles 12.

Therefore, the junctional process accommodation grooves 130 allow the user's weight to be applied to the transverse processes 24 and the costal tubercles 12, thereby increasing restoring force for restoring the vertebrae and the ribs to the normal positions. The costal tubercle stimulating protrusions 120 stimulate the costal tubercles 12. The junctional process accommodation grooves 130 increase the stimulation force to be applied to the costal tubercles 12. The costal tubercle stimulating protrusions 120 restore the twisted ribs to the normal positions.

Next, the foam roller 100 moves downward along the spine from the cervical vertebrae of the neck and stimulates the hamstring, the back muscles, and the muscles at the rear side of the human body. The foam roller 100 serves to restore positions of the pelvis (ilium) and the sacrum which are other bones in the movement route of the foam roller 100. The ilia have the posterior superior iliac spines (PSISs) at both sides at the upper sides of the buttocks, and the upper portions of the ilia are restored by fixing the posterior superior iliac spines or stimulating the posterior superior iliac spines upward and downward. The ilia have, at both sides thereof, ischial tuberosities below the buttocks, and the lower portions of the ilia are restored by fixing the ischial tuberosities or stimulating the ischial tuberosities upward and downward.

The sacrum has the sacral apex raised at the upper side of the coccyx, and the sacrum is fixed to the pelvis and movable forward and rearward with respect to the human body. Therefore, the sacrum may be restored to the correct position by moving the foam roller 100 upward and downward with respect to the sacral apex.

The spine-correcting orthopedic foam roller 100 for improving metabolism according to the exemplary embodiment of the present invention corrects the positions of the cervical vertebrae, the vertebrae, and the sacrum. Therefore, the improved neurotransmission activates the limited biological tissue, balances the autonomic nerves, and thus contributes to the improvement of metabolism for maintaining homeostasis of the human body.

While the exemplary embodiments of the present invention have been illustrated and described above, the present invention is not limited to the specific exemplary embodiments, and various modifications can of course be made by those skilled in the art to which the present invention pertains without departing from the subject matter of the present invention as claimed in the claims. Further, the modifications should not be appreciated individually from the technical spirit or prospect of the present invention.

The invention claimed is:

1. A spine-correcting orthopedic foam roller for improving metabolism, the spine-correcting orthopedic foam roller comprising:

a spinous process accommodation groove configured to accommodate a spinous process of a vertebra;

transverse process stimulating parts extending from the spinous process accommodation groove and protruding from portions of the spine-correcting orthopedic foam roller configured to correspond to transverse processes of the vertebra;

junctional process accommodation grooves extending in an axial direction from the transverse process stimulating parts and configured to accommodate junctional processes which are ends of the transverse processes at which transverse costal facets are formed;

costal tubercle stimulating protrusions extending in an axial direction from the junctional process accommodation grooves and protruding from portions of the spine-correcting orthopedic foam roller configured to correspond to costal tubercles; and costal shaft accommodation grooves extending from the junctional process accommodation grooves and recessed in portions of the spine-correcting orthopedic foam roller configured to correspond to costal shafts and configured to accommodate ribs, wherein a depth of the junctional process accommodation grooves is shallower than a depth of the costal shaft accommodation grooves, wherein each of the costal shaft accommodation grooves and the junctional process accommodation grooves is formed with constant depth and width along a circumferential direction, wherein an axial length (L1) of the costal shaft accommodation grooves is 100 to 140 mm, an axial length (L2) of the costal tubercle stimulating protrusions is 20 to 30 mm, an axial length (L3) of the junctional process accommodation grooves is 10 to 30 mm, an axial length (L4) of the transverse process stimulating parts is 10 to 30 mm, and an axial length (L5) of the spinous process accommodation groove is 30 to 40 mm.

2. The spine-correcting orthopedic foam roller of claim 1, wherein a disk diameter of the transverse process stimulating parts is equal to or greater than a disk diameter of the costal tubercle stimulating protrusions.

3. The spine-correcting orthopedic foam roller of claim 1, wherein the spinous process accommodation groove, the transverse process stimulating parts, the junctional process accommodation grooves, the costal shaft accommodation grooves, and the costal tubercle stimulating protrusions are formed in the circumferential direction on an outer circumferential surface of the spine-correcting orthopedic foam roller.

* * * * *